United States Patent

Marken

(10) Patent No.: US 8,054,011 B2
(45) Date of Patent: Nov. 8, 2011

(54) VARIABLE FREQUENCY TRANSFORMER HAVING MULTIPLE HORIZONTAL ROTARY TRANSFORMERS WITH COMMON CONTROLS AND VOLTAGE INFRASTRUCTURE AND METHOD

(75) Inventor: Paul E. Marken, Columbia City, IN (US)

(73) Assignee: General Electric Company, Schenectady, NY (US)

( * ) Notice: Subject to any disclaimer, the term of this patent is extended or adjusted under 35 U.S.C. 154(b) by 372 days.

(21) Appl. No.: 12/491,824

(22) Filed: Jun. 25, 2009

(65) Prior Publication Data

US 2010/0328978 A1 Dec. 30, 2010

(51) Int. Cl.
*H02P 5/46* (2006.01)
*H02J 3/00* (2006.01)
*F01B 21/04* (2006.01)
*H02M 5/16* (2006.01)

(52) U.S. Cl. ............... 318/68; 318/41; 318/45; 318/90; 307/85; 60/700; 363/171

(58) Field of Classification Search ............. 318/41, 318/45, 68, 90; 307/85; 363/171; 60/700
See application file for complete search history.

(56) References Cited

U.S. PATENT DOCUMENTS

| | | | |
|---|---|---|---|
| 3,471,708 A | 10/1969 | Rauhut et al. | |
| 4,677,354 A * | 6/1987 | Pascal et al. | 318/153 |
| 4,952,852 A * | 8/1990 | Bando et al. | 318/140 |
| 5,841,267 A | 11/1998 | Larsen | |
| 5,952,816 A | 9/1999 | Larsen | |
| 5,953,225 A * | 9/1999 | Larsen | 363/174 |
| 6,356,472 B1 | 3/2002 | Runkle et al. | |
| 6,456,021 B1 | 9/2002 | McLaren et al. | |
| 6,465,926 B2 | 10/2002 | Rehder et al. | |
| 6,469,414 B2 | 10/2002 | Rehder et al. | |
| 6,472,791 B1 | 10/2002 | Rehder et al. | |
| 6,741,485 B1 | 5/2004 | Runkle et al. | |
| 6,753,634 B2 | 6/2004 | Rehder | |
| 6,837,644 B2 * | 1/2005 | White et al. | 403/337 |
| 6,987,344 B2 * | 1/2006 | White et al. | 310/232 |
| 2002/0057027 A1 * | 5/2002 | McLaren et al. | 310/114 |
| 2003/0178910 A1 * | 9/2003 | White et al. | 310/266 |

OTHER PUBLICATIONS

General Electric Company, GE Energy, Variable Frequency Transformer Fact Sheet, Oct. 2004, 2 pages.
General Electric Company, GE Energy, "Variable Frequency Transformers—Grid Inter-tie," Aug. 2004, 8 pages.

(Continued)

*Primary Examiner* — Walter Besnon
*Assistant Examiner* — Gabriel Agared
(74) *Attorney, Agent, or Firm* — Nixon & Vanderhye P.C.

(57) ABSTRACT

A variable frequency transformer including: a first parallel circuit including at least two of the rotary transformers arranged in parallel and having an isolating circuit breaker connected to a rotor winding of each of the rotary transformers, and a separate synchronizing circuit breaker connected to a stator winding in each of the rotary transformers in the first parallel circuit; a first main transformer having a first winding connectable to a first power grid and a secondary winding connectable to the isolating circuit breaker in the first parallel circuit; a second main transformer having a first winding connectable to a second power grid and a secondary winding connectable to each of the synchronizing circuit breakers in the first parallel circuit, and a control system operatively connected to each of the synchronizing circuit breakers, the isolating circuit breakers and the drive motors for each of the rotary transformers.

21 Claims, 5 Drawing Sheets

OTHER PUBLICATIONS

Gagnon, J-M. et al., "A 100 MW Variable Frequency Transformer (VFT) on the Hydro-Quebec Network, A New Technology for Connecting Asynchronous Networks," CIGRE 2006, 8 pages.

Larsen, E. et al., "Variable Frequency Transformer—A New Alternative for Asynchronous Power Transfer," GE Energy and Hydro-Quebec TransEnergie, 2004, 10 pages.

Marken, P. et al., "VFT Maintenance and Operating Performance," IEEE 2008, 5 pages.

Mc Nabb, D. et al., "Transient and Dynamic Modeling of the New Langlois VFT Asynchronous Tie and Validation with Commissioning Tests," Paper No. IPST05-075, International Conference on Power Systems Transients (IPST) 2005, Montreal, Canada, Jun. 19-23, 2005, 6 pages.

Miller, N. et al., "Variable Frequency Transformer: Applications for Secure Inter-regional Power Exchange," PowerGen Middle East 2006, Abu Dhabi, Jan. 2006, 10 pages.

Rob O'Keefe and David Kidd, "United States and Mexico Cross-Border Connection," Transmission & Distribution World, Aug. 1, 2006, 3 pages.

* cited by examiner

VARIABLE FREQUENCY TRANSFORMER HAVING MULTIPLE HORIZONTAL ROTARY TRANSFORMERS WITH COMMON CONTROLS AND VOLTAGE INFRASTRUCTURE AND METHOD

BACKGROUND OF THE INVENTION

The invention relates to variable frequency transformers (VFTS) and, particularly, to the arrangement of rotary transformers, controls and infrastructure in VFTs.

Variable frequency transformers are conventionally used to connect one power grid to another power grid. The two power grids carry alternating electrical current (AC) at potentially different frequencies, phases and voltages. A VFT provides a controlled alternating current (AC) path between two power grids. A VFT converts the AC power from one power grid to a frequency, phase and voltage that is suitable for the AC power in the other power grid.

A variable frequency transformer is a continuously phase shifting transformer that operates at an adjustable phase angle. The VFT may be a bi-directional current transmission device that converts AC current from a first power grid for a second power grid, and vice versa. A VFT typically includes a rotary transformer with three-phase windings on the rotor and the stator. The collector for the rotary transformer conducts current between the three-phase rotor winding and stationary conductors, e.g., busses, associated with the VFT. A drive motor and drive system adjusts a rotational position of a rotor in the VFT relative to the VFT stator to control the magnitude, frequency, phase and direction of AC power flowing through the VFT.

The rotary transformer in a VFT is conventionally a single large transformer such as used in hydro-power generation. These transformers rotate in a horizontal plane about a large vertical shaft. While conventional variable frequency transformers have been arranged in parallel at a substation to form a large asynchronous interconnection between power grids, these parallel transformers were operated and controlled as separate transformers. The transformers are massive and the shafts for the transformers are extensive. Because of the large transformer with a long vertical shaft, the VFT requires a special building with a high ceiling.

VFTs are conventionally large devices that are relatively tall, in that they typically include a large rotary transformer having a vertical rotating shaft. Conventional VFTs typically require expensive infrastructure to support the transformer and are housed in special tall buildings. A VFT may be installed at a substation between two electrical grids. These substations are often remote and not easily accessible for construction of the VFT. The construction costs for installing a VFT at a remote substation can be substantial.

BRIEF DESCRIPTION OF THE INVENTION

A variable frequency transformer asynchronous power transformer has been developed that includes multiple relatively small rotating machines, e.g., using large motor technology instead of hydro generator technology to create rotary transformers, which in combination convert AC power from one power grid to AC power compatible with another power grid. The multiple smaller rotating machines are connected in groups of parallel machines, and are commonly controlled to form a single variable frequency transformer.

A variable frequency transformer comprising: a plurality of rotary transformers each including a rotor winding, a stator winding and a drive motor; a first parallel circuit including at least two of the rotary transformers arranged in parallel and having an isolating circuit breaker connected to a first winding of each of the at least two of the rotary transformers in the first parallel circuit, wherein the first winding is the rotor winding or the stator winding, and a separate synchronizing circuit breaker connected to each of a second winding for each of the rotary transformers in the first parallel circuit, wherein the second winding is the rotor winding or the stator winding which is not the first winding; a second parallel circuit including at least two of the rotary transformers arranged in parallel and having an isolating circuit breaker connected to the first winding of each of the at least two of the rotary transformers in the second parallel circuit, and a separate synchronizing circuit breaker connected to each second winding for each of the rotary transformers in the second parallel circuit; a first main transformer having a first winding connectable to a first power grid and at least one secondary winding connectable to the isolating circuit breaker in the first parallel circuit and in the second parallel circuit; a second main transformer having a first winding connectable to a second power grid and at least one secondary winding connectable to each of the synchronizing circuit breakers in the first parallel circuit and in the second parallel circuit, and a control system operatively connected to each of the synchronizing circuit breakers, the isolating circuit breakers and the drive motors for each of the rotary transformers.

A variable frequency transformer comprising: a plurality of rotary transformers each including a rotor, a rotor winding, a stator winding and a drive motor, wherein the drive motor turns the rotor and rotor winding at a rotational speed determined by a control system; a first parallel circuit including at least two of the rotary transformers arranged in parallel and having an isolating circuit switch connected to a first winding of each of the at least two of the rotary transformers in the first parallel circuit, wherein the first winding is the rotor winding or the stator winding, and a separate synchronizing circuit switch connected to each of a second winding for each of the rotary transformers in the first parallel circuit, wherein the second winding is the rotor winding or the stator winding which is not the first winding; a second parallel circuit including at least two of the rotary transformers arranged in parallel and having an isolating circuit switch connected to the first winding of each of the at least two of the rotary transformers in the second parallel circuit, and a separate synchronizing circuit switch connected to each of the second winding for each of the rotary transformers in the second parallel circuit; a first main transformer having a first winding connectable to a first power grid and at least one secondary winding connectable to the isolating circuit switch in the first parallel circuit and in the second parallel circuit; a second main transformer having a first winding connectable to a second power grid and at least one secondary winding connectable to each of the isolating circuit switches in the first parallel circuit and in the second parallel circuit, and a control system operatively connected to each of the synchronizing circuit switches, the isolating circuit switches and the drive motors for each of the rotary transformers.

A method for synchronizing rotary transformers in a variable frequency transformer converting alternating current (AC) power in a first power grid to AC power for a second power grid, the method comprising: closing a first isolating circuit breaker to connect the first power grid to a first parallel circuit and sequentially synchronizing each of a plurality of rotary transformers in the first parallel circuit, wherein each rotary transformer is synchronized by controlling a drive motor applied to a rotor of the rotary transformer and as each rotary transformer is synchronized closing a synchronizing circuit breaker to connect the synchronized rotary transformer to a second power grid, and after synchronizing the rotary transformers in the first parallel circuit to the second power grid, closing a second isolating circuit breaker to connect the first power grid to a second parallel circuit and sequentially synchronizing each of a plurality of rotary transformers in the second parallel circuit, wherein each rotary transformer is synchronized by controlling a drive motor applied to a rotor of the rotary transformer and as each rotary transformer is synchronized closing a synchronizing circuit breaker to connect the synchronized rotary transformer to a second power grid.

DETAILED DESCRIPTION OF THE INVENTION

Figure 1:
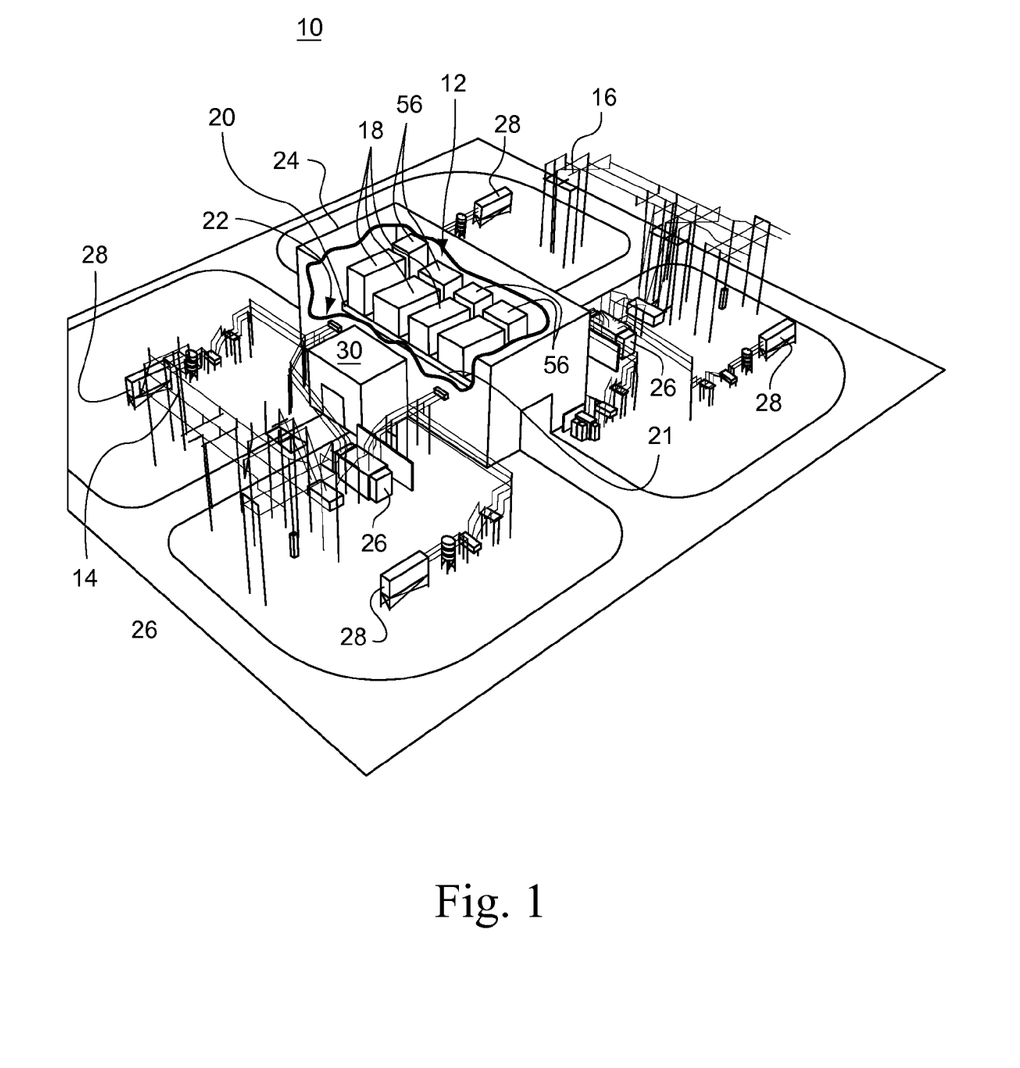
FIG. 1 is a diagram of a power substation having a variable frequency transformer arranged to convert the power from one power grid coupled to the substation to another power grid coupled to the substation.

FIG. 1 is a diagram of a power substation 10 having a variable frequency transformer 12 to convert the power from one power grid 14 (shown in the figure as high voltage lines) coupled to the substation to another power grid 16 (shown has high voltage lines) coupled to the substation. The variable frequency transformer 12 comprises two or more pairs of rotating machines 18 (four rotary transformers are shown in FIG. 1).

These rotating machines 18 may include a rotor, stator and drive motor that are configured to operate as a transformer. The rotating machines may, for example, be a conventional industrial motor, such as a 25 mega-watt (MW) motor that may be conventionally used in a manufacturing plant or for marine ship propulsion. The rotor shaft of each of the rotating machines may be horizontal. The rotating machines may be mounted on one or more steel frames 20, 21 that are seated on a rectangular foundation 22 of a building 24 in the substation. Each frame 20, 21 may support the rotating machines, e.g., two, in one of the parallel circuits 42, 44.

During construction of the substation, the building 24 and steel frames 20 may be prefabricated and transported to the construction site of the substation. The building 20 need not be as tall as building needed for conventional VFT having a vertically oriented rotor. Because the rotating machines 18 are preferably smaller and lighter than the rotating machines conventionally used as VFTs, the rotating machines 18 are relatively easy to transport and install at the substation.

The substation may also include conventional substation components such as: main transformers 26 for each of the power grids 14, 16, that convert the AC voltage level from each grid to a voltage level suitable for the variable frequency transformer 12; Volt-Ampere Reactive (VAR) banks 28 to control the reactive power flow of AC current through the substation, and a control building 30 housing computer, sensor monitoring instruments and other equipment to control and monitor the variable frequency transformer.

Figure 2:
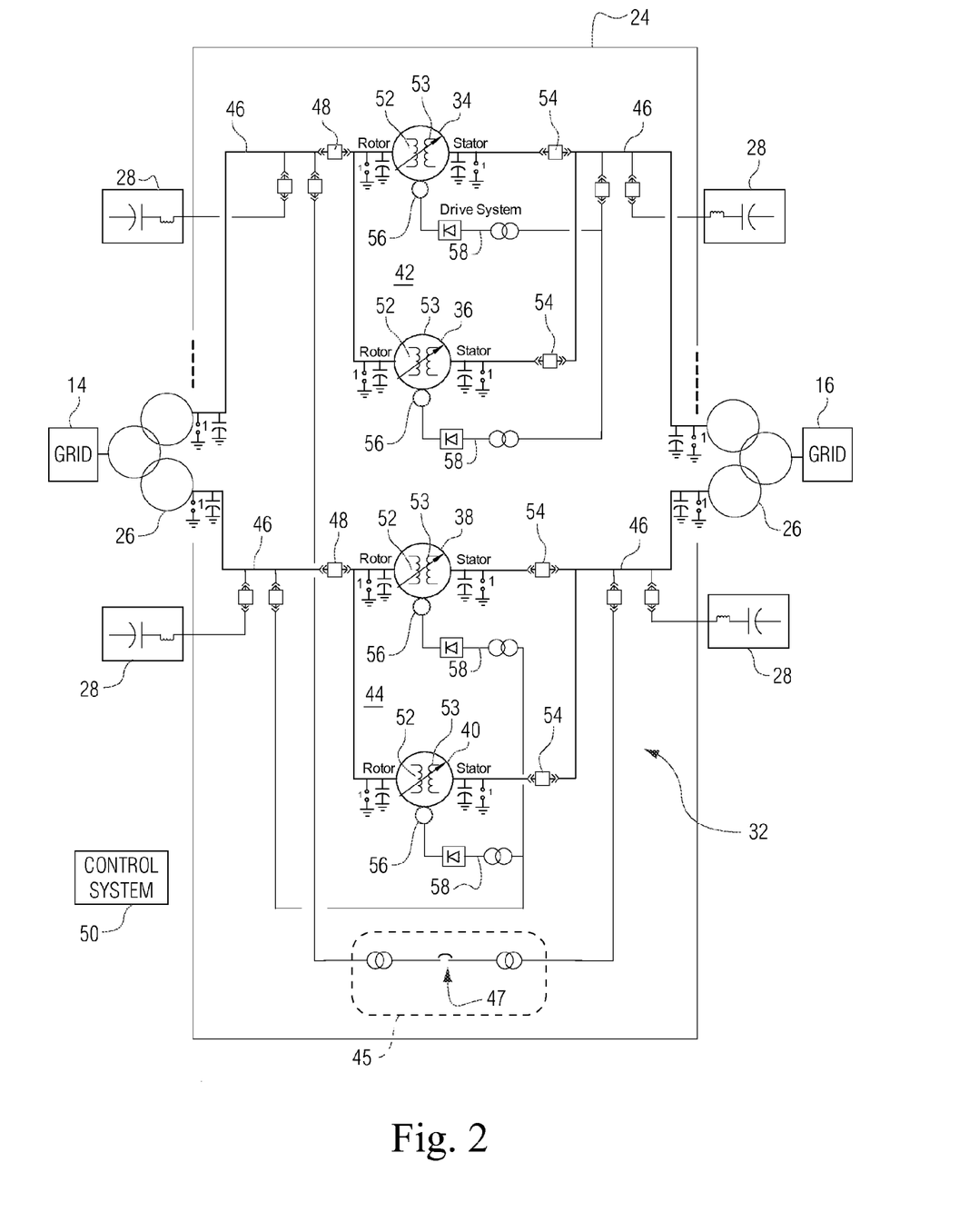
FIG. 2 is an electrical schematic diagram of a first embodiment of a variable frequency transformer arranged to couple two power grids.

FIG. 2 is an electrical schematic diagram of a first embodiment of a variable frequency transformer converter 32 arranged to couple the power grids 14, 16. The variable frequency transformer converter 32 comprises four rotary transformers 34, 36, 38, 40 arranged in pairs, such that transformers 34 and 36 are arranged in a first parallel circuit 42 and transformers 38 and 40 are arranged in a second parallel circuit 44.

In the embodiment shown in FIG. 2, a 100 MW variable frequency transformer 32 is formed by coupling the four 25 MW rotary transformers 34, 36, 38 and 40. Each rotary transformer may be of the same rated power capacity, e.g., 25 MW. The rotor windings and stator windings in each of the rotary transformers are three-phase windings. The main transformers 26 are each a three-winding, step up transformer having two secondary windings. Each of the secondary windings of the main transformers 26 are connected to a circuit pair 42, 44 of the rotary transformers. Each of these parallel circuits 42, 44 are coupled at their respective ends to the main transformer 26 for each of the power grids 14, 16. The circuit pairs 42, 44 are thus not connected to the same secondary windings of the main transformers. Thus, each parallel circuit 42, 44 is separately coupled to the power grids 14, 16, through the main transformers 26.

The parallel circuits 42, 44 are not directly coupled to each other. Auxiliary power is supplied via the auxiliary power circuit 45 to each of the parallel circuits. The auxiliary power circuit is connected to one side of one of the parallel circuits 42 and to an opposite side of the other parallel circuit 44 to allow auxiliary power to come from either grid. The auxiliary power circuit can include isolating transformers and a tie circuit breaker 47. The circuit breaker 47 is normally open and is closed when one auxiliary transformers is out of service.

The main transformers 26 convert the AC voltage level in each of the power grids 14, 16 to a power level, e.g., 13.8 kilo-Volts (kV) for the rotating machines 34, 36, 38 and 40. The VAR banks 28, e.g., 12.5 MVAR shunt banks, assist to enhance the utility power factor of the AC current in each of the power conductors 46 between the main transformers 26 and a terminal of each of the parallel circuits 42, 44 of the rotary transformers.

A single isolating circuit breaker 48 is provided at a common terminal at one end of each of the parallel circuits 42, 44 of the rotary transformers. Closing the isolating circuit breaker 48 allows AC power from one of the power grids 14 to flow through the main transformer 26 to both of the rotary transformers in the parallel circuit associated with the isolating circuit breaker.

The isolating circuit breaker for each parallel circuit 42, 44 is connected to the three-phase rotor windings 52 of each of the rotary transformers 34, 36, 38 and 40. The AC power from the power grid 14 may be applied to the rotor windings 52 to drive the rotor and induce AC current in the stator windings 53 of each of the rotary transformers 34, 36, 38 and 40. The AC current from each the stator windings 53 is generated at a synchronized phase and common frequency suitable for the second power grid 16.

The isolating circuit breaker 48 for each of the parallel circuits 42, 44 is controlled by a common control system 50, which may be a computer system programmed to switch the isolating circuit breakers in a startup sequence that couples the power grid 14 to the parallel circuits such that the rotary transformers are synchronized. There is a synchronizing circuit breaker 54 for each individual rotary transformer. Each of the synchronizing circuit breakers 54 are controlled by the control system and may be opened and closed during the startup sequence when the rotary transformers are synchronized with each other and the power grids.

Each rotary transformer 34, 36, 38 and 40 may include a rotor with rotor windings 52, a stator with stator windings 53 that surround the rotor and a drive motor 56. The rotor and stator windings may be three-phase windings to carry three-phase AC power that is generally used in power grids. The drive motor applies torque to the rotor of its respective rotary transformer. The torque from the drive motor turns the rotor and its rotor windings that have current from a power grid 14. The rotating current field from the rotor creates current in the stator windings that is output to the other power grid 16. The drive motors 56 are each powered by current from one of the power grids that is supplied through a drive system 58 that includes an isolating transformer and DC drive system.

The control system 50 monitors and controls the drive motors, including establishing the torque and rotational speed of the drive motors applied to the rotors of the rotary transformers. The control system separately regulates the rotational speed and phase of the rotor in each of the rotary transformers. By regulating the speed and phase of the rotor in a rotary transformer, the control system controls the rotational position of the rotor with respect to the stator and, thereby, controls the power magnitude, current direction, and current phase through the transformer. In addition, the control system synchronizes the AC power output be each of the rotary transformers to the AC power output by the other rotary transformers and to the receiving power grid. The control system sequentially synchronizes the rotary transformers such that each transformer is synchronized separately from the other transformers.

Figure 3:
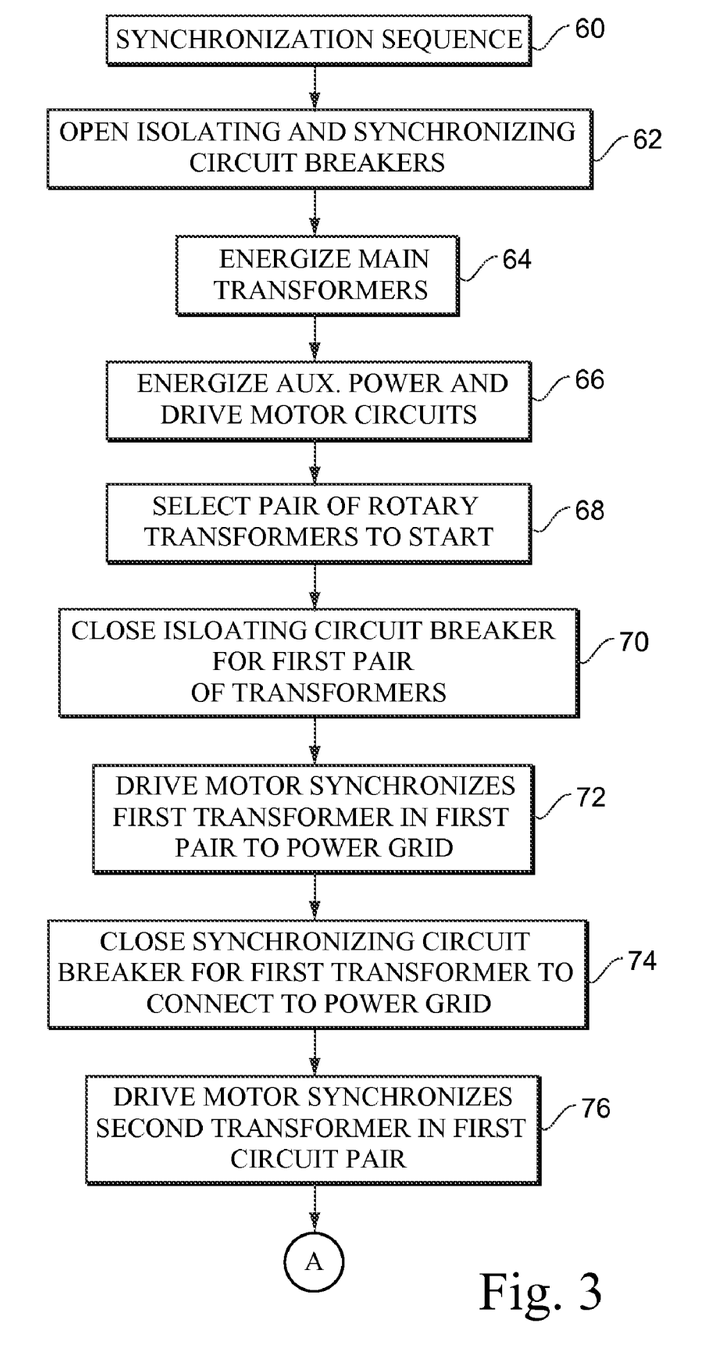
FIGS. 3 and 4 present a flow chart of an exemplary control sequence for synchronizing the transformers in a variable frequency transformer.
Figure 4:
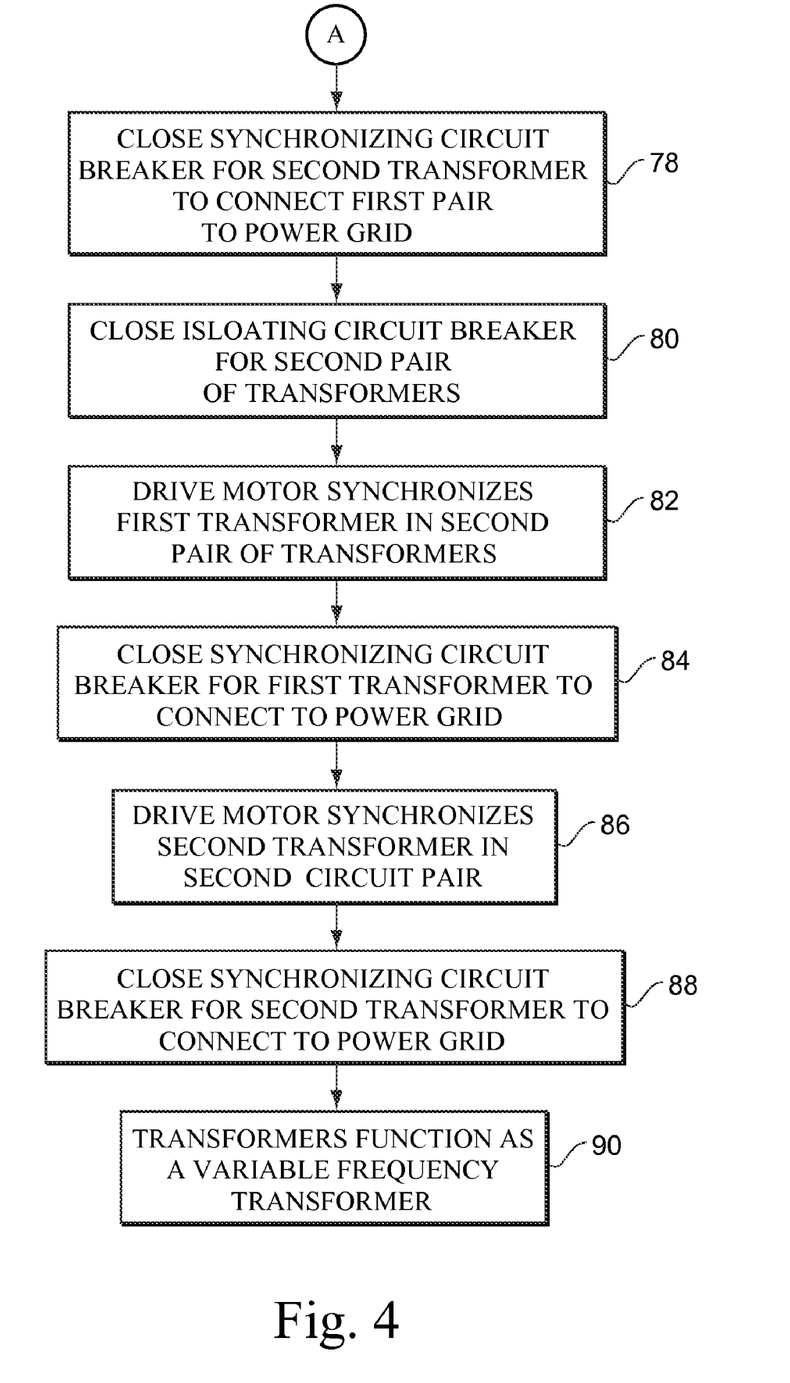

FIGS. 3 and 4 present a flow chart of an exemplary sequence 60 to synchronize the rotary transformers forming a variable frequency transformer 12, 32 with the power grids. Initially, the isolating and synchronizing circuit breakers are initially opened, in step 62. To establish a power connection between the power grids is desired, the three-winding, step-up main transformers 26 are energized in step 64 which energizes the auxiliary power system 45 and drive motor systems 58, in step 66.

In step 68, the control system selects a first of the parallel circuits 42 to start the rotary transformers in the selected circuit and synchronize those transformers to the power grids 14, 16. In step 70, the control system 50 closes the isolating circuit breaker 48 for the first parallel to energize one of the circuit pairs 42, 44 of rotary transformers. The control system synchronizes a first rotary transformer 34 in the first selected parallel circuit 42, in step 70. To synchronize the first transformer 34, the control system 50 operates the associated drive system 58 and drive motor 56 for the first rotary transformer to synchronize the transformer to the output power grid 16, in step 72. When the first rotary transformer 34 is synchronized, the synchronizing circuit breaker 54 associated with the selected first parallel circuit 42 is closed to couple the output power from the first rotary transformer to the output power grid 16, in step 74.

After the first rotary transformer 34 is connected to the power grids 14, 16, the control system 50 operates the drive motor and drive system 56, 58 to synchronize the second rotary transformer 36 in the first selected parallel circuit 42, in step 76. When the second rotary transformer 36 has been synchronized with the first transformer 34, the control system closes the second synchronizing circuit breaker 54 in the first selected parallel circuit 42, in step 78.

After the transformers 34, 36 of the first parallel circuit 42 have been started and synchronized to each other an the power grids, the control system 50 closes the second isolation circuit breaker 48 to couple the power grid 14 to the second selected parallel circuit 44 and energize the rotary transformers 38, 40, in step 80. The control system 50 operates the drive motor and drive system to synchronize a first rotary transformer 38 in the second selected parallel circuit 44. In step 82, the first rotary transformer 38 is synchronized to produce AC power at the stator windings that has the same frequency, voltage and phase as output by the synchronized transforms in the first selected parallel circuit 42 and that is compatible with the second power grid 16. After synchronization of the first rotary transformer in step 80, the control system 50 closes the synchronizing circuit breaker 54 coupled to that transformer 38 to connect the transformer to the second power grid 16, in step 84.

In step 86, the second rotary transformer 40 in the second parallel circuit 44 is also synchronized to output from its stator windings AC power at the same frequency, phase and voltage as the other synchronized transformers 34, 36 and 38. The rotary transformer 40 is synchronized by use of the associated drive motor and drive system which is regulated by the control system. When synchronized, the control system closes the synchronizing circuit breaker for the second rotary transformer 40 to couple the output of the transformer to the second power grid 16, in step 88. When each of the rotary transformers 34, 36, 38 and 40 are synchronized and the circuit breakers 48, 54 are closed, the rotary transformers are combined to function as single variable frequency transformer to convert AC power from one grid 14 to AC power applied to another grid 16, in step 90.

Figure 5:
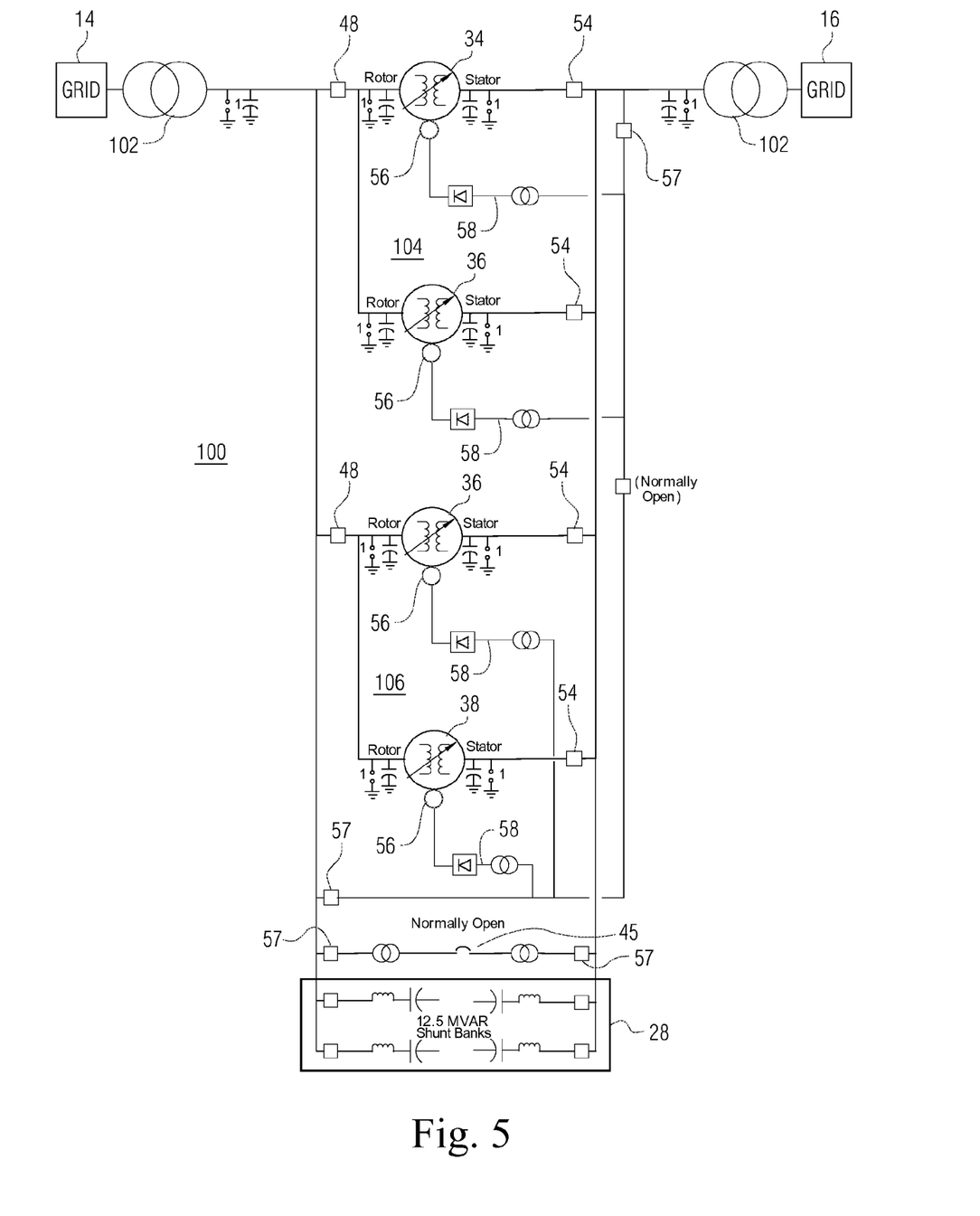
FIG. 5 is an electrical schematic diagram of a second embodiment of a variable frequency transformer converter arranged to couple two power grids.

FIG. 5 is an electrical schematic diagram of a second embodiment 100 of a variable frequency transformer arranged to couple two power grids 14, 16. The second embodiment has many of the same components as the first VFT embodiment shown in FIG. 2 and such components share common reference numbers and are described in connection with FIG. 2. In the second embodiment, the VFT 100 is coupled to each power grid by a respective two-winding main transformer 102. The VFT 100 includes four 25 MW rotary transformers 34, 36, 38 and 40 connected in parallel between the two-winding transformers 102 to create a 100 MW variable frequency transformer interconnection.

As with the first embodiment, the rotary transformers are arranged in pairs 104, 106 with the rotors of each pair of transformers connected to an isolating circuit breaker 48. There is also a separate synchronizing circuit breaker 54 coupled to the stator of each of the rotary transformer, as is in the first embodiment.

As with the first embodiment and described in connection with FIGS. 3 and 4 before, the sequence for energizing and synchronizing the VFT 100 involves first closing an isolating circuit breaker 48 for one pair 104 of transformers and synchronizing a first and then a second transformer by controlling the drive motor and drive system 56, 58 for each transformer. As each transformer 34, 36 is synchronized, the control system 50 closes the corresponding synchronizing circuit breaker 54 to connect the stator output of the transformer to the power grid 16. After the first pair 104 of transformers are coupled to the power grid 16, the isolating circuit breaker 48 for the second pair 106 of transformers is closed and the individual rotary transformers 38, 40 are sequentially synchronized and their respective synchronizing circuit breakers 54 are closed to couple each transformer to the power grids 14 and 16.

There are other configurations of rotary transformers to form a VFT that embody the disclosure shown herein. For example, three rotary transformers may be arranged as a unit in parallel with one isolating circuit breaker and three synchronizing circuit breakers. These units of two or three rotary transformers may be combined with other units to form VFTs having five, six or more individual rotary transformers. In other embodiments, an isolating circuit breaker may be connected to the rotor winding for each of the rotary transformers and a synchronizing circuit breaker may be connected to the stator windings of the rotary transforms in each parallel circuit.

Further, the size of each individual rotary transformer may be selected to reduce acquisition and operation costs. The size of the overall VFT interconnection between power grids is thus based on the size of the power interconnection required and is not directly dependent on the size of the individual rotary transformers.

By combining the smaller rotary transformers as disclosed herein a variable frequency transformer can be formed having a rating equal to the combined ratings of these smaller rotary transformers. By combining relatively small individual rotary transformers, advantages can be realized in acquisition and construction costs as compared to a conventional VFT having one or a few large rotary transformers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A variable frequency transformer comprising:
   a plurality of rotary transformers each including a rotor winding, a stator winding and a drive motor;
   a first parallel circuit including at least two of the rotary transformers arranged in parallel and having an isolating circuit breaker connected to a first winding of each of the at least two of the rotary transformers in the first parallel circuit, wherein the first winding is the rotor winding or the stator winding, and a separate synchronizing circuit breaker connected to each of a second winding for each of the rotary transformers in the first parallel circuit, wherein the second winding is the rotor winding or the stator winding which is not the first winding;
   a first main transformer having a first winding connectable to a first power grid and at least one secondary winding connectable to the isolating circuit breaker in the first parallel circuit;
   a second main transformer having a first winding connectable to a second power grid and at least one secondary winding connectable to each of the synchronizing circuit breakers in the first parallel circuit, and
   a control system operatively connected to each of the synchronizing circuit breakers, the isolating circuit breakers and the drive motors for each of the rotary transformers.

2. The variable frequency transformer of claim 1 further comprising:
   the at least one secondary winding of the first main transformer connectable to the isolating circuit breaker in the second parallel circuit, and
   the at least one secondary winding of the second main transformer connectable to each of the synchronizing circuit breakers in the second parallel circuit.

3. The variable frequency transformer of claim 2 wherein the first main transformer and the second main transformer each include a first and a second of the at least one secondary windings, wherein the first parallel circuit is connected to the first secondary winding of each of the first and second main transformers and the second parallel circuit is connected to the second secondary winding of each of the first and second main transformers.

4. The variable frequency transformer of claim 1 wherein the control system includes a computer programmed to execute a program stored on a computer readable medium in the control system, wherein the program sequentially synchronizes each of the rotary transformers by controlling the drive motor for each rotary transformer and switching the isolating and synchronizing circuit breakers.

5. The variable frequency transformer of claim 1 wherein the first winding is the rotary winding and the second winding is the stator winding.

6. The variable frequency transformer of claim 1 wherein the rated power output of each of the rotary transformers is substantially the same.

7. The variable frequency transformer of claim 2 wherein the drive motors for the rotary transformers in the first parallel circuit are electrically connectable to the at least one secondary winding of the first main transformer, and the drive motors for the rotary transformers in the second parallel circuit are electrically connectable to the at least one secondary winding of the second main transformer.

8. The variable frequency transformer of claim 1 wherein the first power grid operates at an AC power having at least one of a power level, frequency and phase different than an AC power at which the second power grid operates.

9. A variable frequency transformer comprising:
   a plurality of rotary transformers each including a rotor, a rotor winding, a stator winding and a drive motor, wherein the drive motor turns the rotor and rotor winding at a rotational speed determined by a control system;
   a first parallel circuit including at least two of the rotary transformers arranged in parallel and having an isolating circuit switch connected to a first winding of each of the at least two of the rotary transformers in the first parallel circuit, wherein the first winding is the rotor winding or the stator winding, and a separate synchronizing circuit switch connected to each of a second winding for each of the rotary transformers in the first parallel circuit, wherein the second winding is the rotor winding or the stator winding which is not the first winding;
   a second parallel circuit including at least two of the rotary transformers arranged in parallel and having an isolating circuit switch connected to the first winding of each of the at least two of the rotary transformers in the second parallel circuit, and a separate synchronizing circuit switch connected to each of the second winding for each of the rotary transformers in the second parallel circuit;
   a first main transformer having a first winding connectable to a first power grid and at least one secondary winding connectable to the isolating circuit switch in the first parallel circuit and in the second parallel circuit;
   a second main transformer having a first winding connectable to a second power grid and at least one secondary winding connectable to each of the isolating circuit switches in the first parallel circuit and in the second parallel circuit, and
   a control system operatively connected to each of the synchronizing circuit switches, the isolating circuit switches and the drive motors for each of the rotary transformers.

10. The variable frequency transformer of claim 9 wherein the control system includes a computer programmed to execute a program stored on a computer readable medium in the control system, wherein the program sequentially synchronizes each of the rotary transformers by controlling the drive motor for each rotary transformer and switching the isolating and synchronizing circuit switches.

11. The variable frequency transformer of claim 9 wherein each of the rotary transformers include a horizontal rotor shaft supporting the rotor winding.

12. The variable frequency transformer of claim 9 wherein the rated power output of each of the rotary transformers is substantially the same.

13. The variable frequency transformer of claim 9 wherein the drive motors for the rotary transformers in the first parallel circuit are electrically connectable to the at least one secondary winding of the first main transformer and the drive motors for the rotary transformers in the second parallel circuit are electrically connectable to the at least one secondary winding of the second main transformer.

14. The variable frequency transformer of claim 9 wherein the first power grid operates at an AC power having at least one of a power level, frequency and phase different than an AC power at which the second power grid operates.

15. The variable frequency transformer of claim 9 wherein the drive motors for the rotary transformers in the first parallel circuit are electrically connectable to the at least one secondary winding of the first main transformer and the drive motors for the rotary transformers in the second parallel circuit are electrically connectable to the at least one secondary winding of the second main transformer.

16. The variable frequency transformer of claim 9 wherein the first power grid operates at an AC power having at least one of a power level, frequency and phase different that an AC power at which the second power grid operates.

17. A method for synchronizing rotary transformers in a variable frequency transformer converting alternating current (AC) power in a first power grid to AC power for a second power grid, the method comprising:
  closing a first isolating circuit breaker to connect the first power grid to a first parallel circuit and sequentially synchronizing each of a plurality of rotary transformers of in the first parallel circuit, wherein each rotary transformer is synchronized by controlling a drive motor applied to a rotor of the rotary transformer and as each rotary transformer is synchronized closing a synchronizing circuit breaker to connect the synchronized rotary transformer to a second power grid, and
  after synchronizing the rotary transformers in the first parallel circuit to the second power grid, closing a second isolating circuit breaker to connect the first power grid to a second parallel circuit and sequentially synchronizing each of a plurality of rotary transformers of in the second parallel circuit, wherein each rotary transformer is synchronized by controlling a drive motor applied to a rotor of the rotary transformer and as each rotary transformer is synchronized closing a synchronizing circuit breaker to connect the synchronized rotary transformer to a second power grid.

18. The method of claim 17 a control system including a computer programmed to execute a program stored on a computer readable medium in the control system, wherein the program sequentially synchronizes each of the rotary transformers by controlling the drive motor for each rotary transformer and switching the isolating and synchronizing circuit breakers.

19. The method of claim 17 wherein the closing of each of the isolating circuit breakers connect a secondary winding of a main transformer connected to the first power grid to a rotor winding in each of the rotary transformers in one of the first and second parallel circuits, and the closing of each of the synchronizing circuit breakers connects a stator winding of a respective rotary transformer to a winding of a main transformer connected to the second power grid.

20. The method in claim 17 wherein the first power grid operates at an AC power having at least one of a power level, frequency and phase different than an AC power at which the second power grid operates.

21. The method of claim 17 wherein the first power grid operates at an AC power having at least one of a power level, frequency and phase different than an AC power at which the second power grid operates.

* * * * *

UNITED STATES PATENT AND TRADEMARK OFFICE
CERTIFICATE OF CORRECTION

| | | |
|---|---|---|
| PATENT NO. | : 8,054,011 B2 | Page 1 of 1 |
| APPLICATION NO. | : 12/491824 | |
| DATED | : November 8, 2011 | |
| INVENTOR(S) | : Marken | |

It is certified that error appears in the above-identified patent and that said Letters Patent is hereby corrected as shown below:

At column 1 line 10, delete "(VFTS)" and insert --(VRTs)--

Signed and Sealed this
Twentieth Day of December, 2011

David J. Kappos
*Director of the United States Patent and Trademark Office*